Figure 1:
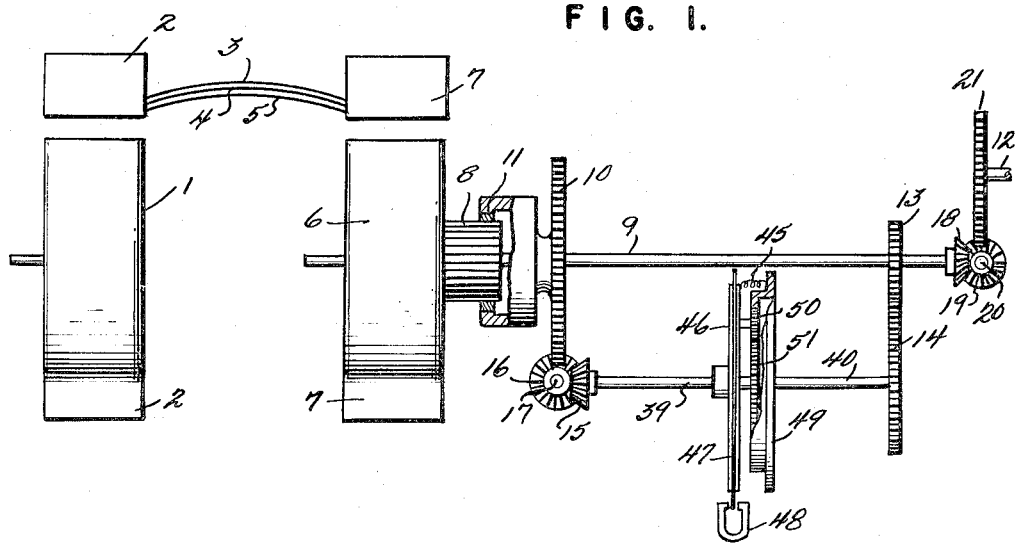

Sept. 28, 1954  G. JOYAU  2,690,530

COMPENSATED FOLLOW-UP SYSTEM

Filed March 20, 1950

INVENTOR
GUY JOYAU
BY Ben. J. Khromy
his ATTORNEY

Patented Sept. 28, 1954

2,690,530

UNITED STATES PATENT OFFICE 2,690,530

COMPENSATED FOLLOW-UP SYSTEM

Guy Joyau, Nantes, France

Application March 20, 1950, Serial No. 150,630

Claims priority, application France
March 23, 1949

5 Claims. (Cl. 318—24)

My invention relates to improvements in remote control systems of the type including receivers constituted by one phase commutator motors chiefly of the repulsion or the like type.

My invention has for its object means for correcting remote control receivers, said means being adapted to remove the constant speed and dynamic errors arising between the input movement and the output movement obtained.

According to a feature of my invention, the receiver of the remote control system includes two elementary receivers, one of which elementary receivers serve for rough operation and the other for accuracy movement. The stator fields of the two elementary receivers revolve at speeds, the ratio between which is equal to $n$ while the movable support of the brushes for the accuracy receiver is connected with the shaft controlling the rough receiver through a gearwork such as will provide a speed reduction equal to $n$ between the movement of said support and the movement of the output shaft, while the rotor of the accuracy receiver controls the annular series of planet pinions of a sun and planet differential gear inserted in the shaft controlling the main or rough receiver.

In the preceding arrangement, the errors arising when the main receiver rotates at constant speed are wiped out through the insertion of a term equal to the annular error between the two parts of the shaft controlling said main receiver.

According to a second feature of my present invention and in order to remove any errors in transmission, the remote control receiver includes again two receivers, of which one serves for rough operation and the other for accuracy movements: the stator fields of the two receivers rotate at speeds the ratio between which is equal to $n$ while the movable support of the brushes of the accuracy receiver is connected with the shaft controlling the main or rough receiver through a gearwork adapted to produce between the movements of said support and of the output shaft a speed reduction equal to $n$; the rotor of the accuracy receiver controls again the annular series of a sun and planet differential inserted in the shaft of the rotor of the main receiver. In said arrangement, the error arising in the main receiver is compensated by the introduction of a term equal to the angular shifting between the two parts of the rotor shaft of said main receiver.

According to a third feature of my invention and with a view to correcting the dynamic errors in the remote control receiver, there is inserted in the transmission between the rotor and the brush carrier an arrangement including a torsion bar or the like spring or elastic arrangement coupling two sections of a shaft of which sections one carries a disk with a peripheral annulus of conductive metal moving between the poles of a magnet. The eddy currents arising in said ring shaped metal brake the disk and consequently the location of the brush carrier is shifted with reference to the rotor.

According to a fourth feature of the present invention and in order also to provide for the correction of the dynamic errors in the remote control receiver, there is also inserted in the transmission between the rotor and the brush carrier an arrangement incorporating a torsion bar or the like spring or elastic device coupling a shaft section with the race of an epicyclic train, a gear carried loosely by said raceway engaging an outer gear connected with said shaft section and an inner gear operatively connected with the other section of the shaft, the race of the epicyclic train including furthermore a ring of conductive metal moving between the poles of a magnet.

According to a still further feature of my invention, and again with a view to correcting the dynamic errors in a remote control receiver, but in a direction opposed to that referred to in the preceding paragraph, the epicyclic gear includes two loose gears rigid with one another and bearing on two inner gears connected respectively with the rotor shaft and with the brush carrier shaft.

Further features relating in particular to the association of the double receiver system with the torsion bar arrangement will appear in the reading of the following description.

Figure 2:
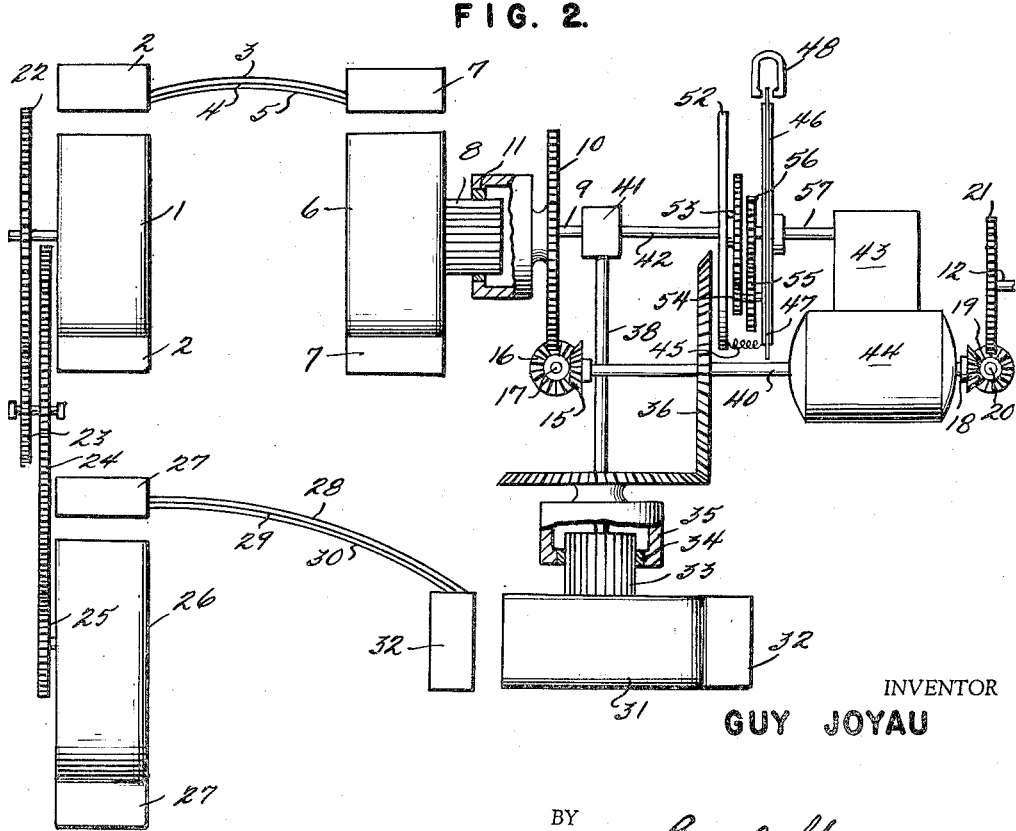

My invention will be described hereinafter with further detail, reference being made to various embodiments disclosed by way of a mere exemplification. This description will refer to accompanying drawings wherein:

Fig. 1 illustrates a remote control system having means for correcting dynamic errors; and Fig. 2 illustrates a remote control system with means for reversing and multiplying the angular shift of the brush carrier through an epicyclic train.

In said Fig. 1, the transmitter that forms no part of the actual invention is constituted by a transmitter of the so-called selsyn type and includes a rotor 1 and a three-phase stator 2. The transmission wires are illustrated at 3—4 and 5. The other end of the transmission feeds the receiver that includes a three-phase wound stator 7 and a rotor 6 forming therewith a repulsion motor. The rotor being carried on a shaft 9 and incorporating a commutator 8. The short-circuit brushes 11 are mounted on a revoluble carrier 10 that is connected with the rotor through a speed reducing gear constituted by sprocket wheels 13 and 14, bevel wheels 15 and 16, a worm 17, and a wormwheel 18, the ratio of speed reduction being equal to $k$. The rotor of the receiver revolves until the brush line registers with the stator field and occupies consequently a position that is homologous with that of the rotor 1 of the transmitter. If said transmitter rotor revolves, its movement will be reproduced at a distance through the carrier of the receiver brushes or through the outer shaft 12 that is connected with the rotor through a speed reducing gear providing a speed reduction also equal to $k$ and constituted by bevel pinions 18 and 19, a worm 20 and a wormwheel 21.

In the arrangement illustrated in Fig. 2, two receivers of the type illustrated in Fig. 1 have been associated as follows:

Reference numbers 1, 2 on one hand and 26 and 27 on the other designate respectively the three phase rotors and stators of two transmitters of the selsyn type that are interconnected through speed-reducing gears 22, 23, 24, 25, the speed reduction being equal to $n$. 3, 4 and 5 on one hand, and 28, 29, 30 on the other designate the transmission wires for each transmission.

The rotor, stator, commutator, rotor shaft, brush carrier and brushes at the receiver end are designated respectively by 6, 7, 8, 9, 10, 11 respectively for the rough operating receiver and by 31, 32, 33, 38, 35 and 34 for the high accuracy receiver. The brush carrier 35 is connected with the rotor shaft 9 of the main or rough operation receiver through a set of gears 35, 36, 14, 13 in a manner such that there may be a speed reduction $n$ between the movement of the brush carrier 35 and the output shaft 12 of the main receiver; the ratio of the gear work 35, 36, 14, 13, 18, 19, 20, 21 being equal to $n$.

The rotor shaft 38 of the high accuracy receiver is also connected with the annular system of planet pinions of the differential gear 41 the sun wheels of which are connected respectively with the elements 9 and 42 of the control shaft.

Thus, the differential gear 41 has one sun wheel controlled by the rotor shaft 9 of the main receiver and its planet system is controlled by the rotor shaft 38 of the auxiliary receiver. The shaft 42 connected with the second sun wheel of the differential controls the speed adjusting member 43 of the power motor 44, the control shaft of which is constituted by the shaft 40.

The amplitude of the movement of the rotor 38 of the auxiliary receiver is limited by two stops in order to prevent any shifting between the main transmitter and receiver when they are first energized. It will be noticed that the arrangement also wipes out any error in transmission when the main receiver runs at constant speed. In order to increase the following up speed without the system becoming unstable, it is possible to provide a return spring to the rotor of each of the two receivers. There remains then an error that is proportional to the speed of the power motor.

This remote control arrangement is intended to provide for the correction of the dynamic errors in the distant control receiver. The movement of the transmitter 1—2 is reproduced by the output shaft 12. There is inserted between the elements of the control shaft 40 and 39 connected respectively with the rotor and the brush carrier, an arrangement including a torsion bar illustrated diagrammatically at 45 and a disc 46 carrying a ring 47 of aluminium or the like metal that is a good conductor for electricity, said ring moving between the poles of a magnet 48. The eddy currents arising in said ring brake the disk. Thus the position of the brush carrier 10 is shifted with reference to the rotor shaft 9. The disk and the magnet are designed in a manner such as will correct the dynamic errors in the receiver.

In this arrangement the rotor drives through the agency of a shaft 40 and spring 45 the race 46 of an epicyclic train. The loose gear 50 carried by said race engages an outer gear 49 driven by the rotor and it drives in its turn an inner gear 51 rigid with the spindle 39 connected with the brush carrier 10. The race 46 is provided with a bearing rotatable on the shaft 39 and supports a ring 47 of conductive metal that is braked by a magnet 48 as described above. A shifting thereof with reference to the shaft 40 will shift with reference to said shaft the shaft 39 through an angle that is a multiple of the original angle, the ratio between the angles considered being of course equal to that of the epicycloidal gear.

In the arrangement of Fig. 2, the shifting between the race 46 and the shaft 42 is multiplied while remaining always of same direction between the shaft 42 and the shaft 57. In fact, the former shaft 42 drives the epicyclic gear train through the agency of the spring 45, and the race 46. The idler gears 54, 55 carried by the race engage respectively a large diameter gear 53 driven by the shaft 42 and a smaller diameter gear 56 rigid with the shaft 57. The race of the epicycloidal gear is braked proportionally to its speed by the magnet 48 acting on the ring 47.

What I claim is:

1. In a distant control transmission system, the combination of a receiver including a stator, a rotor, a commutator rigidly connected to said rotor, a set of diametrically opposed interconnected brushes frictionally contacting said commutator, and a carrier for said brushes, said carrier being adapted to be shifted angularly around said commutator, a means operatively connecting said movable brush carrier with said rotor, said means including a two-element shaft, a resilient connection between said elements of said shaft, a metallic annulus rigidly connected with one of said shaft elements, and means for producing eddy currents in said annulus proportional to the rotation of said annulus, thereby braking the movement of said annulus to reduce the dynamic error of the system.

2. In a distant control transmission system, the combination of a receiver including a stator, a rotor, a commutator rigidly connected to said rotor, a set of diametrically opposed interconnected brushes frictionally contacting said commutator and a movable carrier for said brushes, said carrier being adapted to be shifted angularly around said commutator, means for operatively connecting said movable brush carrier with said rotor, said means including a driven member and a driving member, an epicyclic train for operatively connecting said two members, said epicyclic train including a race, resilient means for connecting said race with said driven member, a metal annulus rigidly connected with said race and means for producing eddy currents in said annulus proportional to the rotation of said annulus, thereby braking the movement of said annulus to reduce the dynamic error of the system.

3. In a distant control transmission system, the combination of a receiver including a stator, a rotor, a commutator rigidly connected to said rotor, a set of diametrically opposed interconnected brushes frictionally contacting said commutator, and a brush carrier for said brushes, said carrier being adapted to be shifted angularly around said commutator, means for operatively connecting said movable brush carrier with said rotor, said means including a driven shaft, a sun wheel on said shaft and a planet engaging said sun wheel, a race for supporting said planet, resilient means for connecting said race with said driven shaft, a metal annulus rigidly mounted on said race and means for producing eddy currents in said annulus proportional to the rotation of said annulus, thereby braking the movement of said annulus to reduce the dynamic error of the system.

4. In a distant control transmission system, the combination of a receiver including a stator, a rotor, a commutator rigidly connected to said rotor, a set of diametrically opposed interconnected brushes frictionally contacting said commutator, and a brush carrier for said brushes, said carrier being adapted to be shifted angularly around said commutator, means for operatively connecting said movable brush carrier with said rotor, said means comprising a driving shaft and a driven shaft, means including an epicyclic train for connecting said shafts, said epicyclic train comprising a sun wheel fixed on the driven shaft and a gear meshing with said sun wheel, a shaft for said gear and a race for supporting said last-mentioned shaft, said gear meshing in turn with a second sun wheel positioned on said driven shaft, a resilient connection between said race and said second sun wheel and a metallic ring rigidly mounted on said race and means to produce Foucault currents within said ring proportional to the speed of rotation of said race, which results in braking of said race and reducing the dynamic error of the system.

5. In a distant control transmission system, the combination of a receiver including a stator, a rotor, a commutator rigidly connected to said rotor, a set of diametrically opposed interconnected brushes frictionally contacting said commutator, and a brush carrier for said brushes, said carrier being adapted to be shifted angularly around said commutator, means for operatively connecting said movable brush carrier with said rotor, said means comprising a driving shaft and a driven shaft, means including an epicyclic train for connecting said shafts, said epicyclic train comprising a first sun wheel fixed on said driving shaft, said first sun wheel meshing with a first planetary gear, a race supporting said first planetary gear, a second planetary gear, means for connecting said planetary gears together, a second sun wheel positioned on said driven shaft and meshing with said second planetary gear, resilient means for connecting said race with said driving shaft, a metallic ring mounted rigidly on said race and means to produce Foucault currents within said ring proportional to the speed of rotation of said race, which causes a braking of said race reducing the dynamic error of the system.

References Cited in the file of this patent

UNITED STATES PATENTS

| Number | Name | Date |
|---|---|---|
| 1,539,187 | Hewlett et al. | May 26, 1925 |
| 2,056,348 | Edwards | Oct. 6, 1936 |
| 2,403,605 | Lesnick | July 9, 1946 |
| 2,458,921 | Adamson | Jan. 11, 1949 |
| 2,469,190 | Adamson | May 3, 1949 |
| 2,484,120 | Robinson | Oct. 11, 1949 |
| 2,508,985 | Adamson | May 23, 1950 |
| 2,628,334 | Weathers | Feb. 10, 1953 |

FOREIGN PATENTS

| Number | Country | Date |
|---|---|---|
| 475,344 | France | May 4, 1915 |
| 508,418 | Great Britain | June 30, 1939 |
| 582,181 | Great Britain | Nov. 7, 1946 |
| 683,021 | France | June 5, 1930 |